US012695317B2

(12) United States Patent
Cassarino et al.

(10) Patent No.: US 12,695,317 B2
(45) Date of Patent: Jul. 28, 2026

(54) BALANCING METHOD OF A SWITCHABLE BATTERY DEVICE BY SHORT-CIRCUITING OF ITS OUTPUT

(71) Applicant: COMMISSARIAT A L'ENERGIE ATOMIQUE ET AUX ENERGIES ALTERNATIVES, Paris (FR)

(72) Inventors: Leandro Cassarino, Grenoble Cedex (FR); Sylvain Bacquet, Grenoble Cedex (FR); Ghislain Despesse, Grenoble Cedex (FR); Eric Fernandez, Grenoble Cedex (FR); Yan Lopez, Grenoble Cedex (FR); Remy Thomas, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 778 days.

(21) Appl. No.: 18/145,398

(22) Filed: Dec. 22, 2022

(65) Prior Publication Data

US 2023/0208153 A1     Jun. 29, 2023

(30) Foreign Application Priority Data

Dec. 23, 2021     (FR) ..................................... 21 14454

(51) Int. Cl.
      *H02J 7/56*          (2026.01)
      *H01M 10/42*          (2006.01)
            (Continued)

(52) U.S. Cl.
      CPC ............. *H02J 7/56* (2026.01); *H01M 10/425* (2013.01); *H01M 10/482* (2013.01); *H02J 7/575* (2026.01); *H01M 2010/4271* (2013.01)

(58) Field of Classification Search
      CPC ...... H02J 7/0019; H02J 7/0024; H02J 7/0016; H02J 7/36; H01M 10/425; H01M 10/482; H01M 2010/4271
            (Continued)

(56) References Cited

U.S. PATENT DOCUMENTS

| | | | | |
|---|---|---|---|---|
| 6,841,971 | B1 * | 1/2005 | Spee ...................... | H02J 7/0016 |
| | | | | 320/119 |
| 7,598,706 | B2 * | 10/2009 | Koski ................... | H02J 7/0016 |
| | | | | 320/128 |

(Continued)

FOREIGN PATENT DOCUMENTS

| | | | | |
|---|---|---|---|---|
| CA | 3 110 428 A1 | 3/2020 | | |
| CN | 110783651 A | * 2/2020 | ........ | H01M 10/4257 |

(Continued)

OTHER PUBLICATIONS

T. H. Phung, J. C. Crebier and Y. Lembeye, "Voltage balancing converter network for series-connected battery stack," IECON 2012—38th Annual Conference on IEEE Industrial Electronics Society, Montreal, QC, Canada, 2012, pp. 3007-3013 (Year: 2012).*

(Continued)

*Primary Examiner* — M Baye Diao
(74) *Attorney, Agent, or Firm* — Oblon, McClelland, Maier & Neustadt, L.L.P.

(57)                ABSTRACT

A battery pack device includes a plurality of energy storage elements configurable in series, each element having at least one switch to selectively connect, disconnect, or bypass the element. The device further includes a switch configured to establish a short circuit between terminals of the battery pack when the pack is disconnected or supplies zero voltage. A control circuit is configured to select at least one first energy storage element in a first state and at least one second energy storage element in a second state, and to cause current to flow from the first element to the second element (Continued)

while the terminals are short-circuited. The control circuit further stops the current when a parameter of the first element, selected from charge, voltage, state of health, temperature, or impedance, becomes equal to a corresponding parameter of the second element or to an average value among multiple elements.

11 Claims, 4 Drawing Sheets

(51) Int. Cl.
　　H01M 10/48　　　(2006.01)
　　H02J 7/50　　　　(2026.01)
(58) Field of Classification Search
　　USPC ......................................................... 320/107
　　See application file for complete search history.

(56) References Cited

U.S. PATENT DOCUMENTS

| | | | | |
|---|---|---|---|---|
| 8,268,465 B2 * | 9/2012 | Nollet | ...................... | H02J 7/855 |
| | | | | 429/50 |
| 9,368,978 B2 * | 6/2016 | Fink | ....................... | H02J 7/0014 |
| 9,525,301 B2 * | 12/2016 | White | ....................... | H02J 7/80 |
| 10,516,275 B2 * | 12/2019 | Klee | ..................... | H01M 10/46 |
| 10,886,754 B2 * | 1/2021 | Kufner | .................. | H02J 7/0019 |
| 11,128,158 B2 * | 9/2021 | Mulawski | ............. | H02J 7/0047 |
| 11,190,028 B2 * | 11/2021 | Karlsson | ............. | H01M 10/482 |
| 11,196,264 B2 * | 12/2021 | Helling | ................. | H02M 7/483 |
| 12,062,815 B2 * | 8/2024 | Muenzel | ............... | H02J 7/0047 |
| 2008/0180061 A1 | 7/2008 | Koski et al. | | |
| 2020/0343742 A1 | 10/2020 | Bacquet et al. | | |
| 2021/0351606 A1 | 11/2021 | Cassarino et al. | | |

FOREIGN PATENT DOCUMENTS

| | | | | | |
|---|---|---|---|---|---|
| EP | | 2681797 B1 | * | 11/2018 | ........ H01M 10/4257 |
| EP | | 3490099 A1 | * | 5/2019 | ............. B60L 58/21 |
| EP | | 2735038 B1 | * | 8/2021 | .......... H01M 50/269 |
| JP | | 2019041497 A | * | 3/2019 | ............. Y02E 60/10 |
| WO | WO 2019/129991 A1 | | | 7/2019 | |

OTHER PUBLICATIONS

S. Shili, A. Hijazi, P. Venet, A. Sari, X. Lin-Shi and H. Razik, "Balancing circuit control for supercapacitor state estimation," 2015 Tenth International Conference on Ecological Vehicles and Renewable Energies (EVER), Monte Carlo, Monaco, 2015, pp. 1-7 (Year: 2015).*

W. F. Choi, Y. P. Yeung, K. W. E. Cheng and S. X. Wang, "Energy management system using ultra-capacitor as energy buffer," 2011 4th International Conference on Power Electronics Systems and Applications, Hong Kong, China, 2011, pp. 1-3 (Year: 2011).*

French Preliminary Search Report and Written Opinion issued Jul. 27, 2022 in French Application 21 14454 filed on Dec. 23, 2021 (with English Translation of Categories of Cited Documents), 9 pages.

* cited by examiner

BALANCING METHOD OF A SWITCHABLE BATTERY DEVICE BY SHORT-CIRCUITING OF ITS OUTPUT

TECHNICAL FIELD AND PRIOR ART

The Invention relates to the field of switchable battery devices. More particularly, it relates to a device and a method which allows carrying out a balancing of a switchable battery device, in particular when the output of the latter is short-circuited.

Usually, in a storage system using Li-ion cells, the cells are balanced with respect to each other, in order to keep them in the most possibly uniform state-of-charge, so that all cells remain available until complete discharge thereof.

In a conventional battery pack, with elements permanently connected together, such a balancing is not possible, unless converters that allow exchanging energy between the elements (which is called active balancing) are added, which is expensive, cumbersome and generates a significant overweight (addition of inductances). In fact, conventional battery packs integrate only a charging end balancing, which ensures that all elements are fully charged at the charging end; but, during discharge, it is the first element to be discharged that stops being discharged, even though there is still energy in the other element: the discharge should stop when the most discharged element reaches its bottom voltage threshold. Symmetrically, normal charging stops as soon as one element is fully charged, i.e. when it reaches its top voltage threshold.

In such a system, there is generally a so-called "charging end balancing" mechanism which allows completing charging of the elements that are still not fully charged: for example, the fully charged element(s)(which prevent continuation of charging) are partially discharged, which enables a charging current to flow again until one or more element(s) reach charging end and so on until all elements are fully charged. Normally, if a given charging amount has been removed from the elements during discharge, the same charging amount reinjected into the elements should allow recovering the initial state-of-charge within a coulometric yield margin. In practice, there might be a little dispersion in the coulometric yield between the elements so that the final state-of-charge of the elements is not homogeneous, thereby the interest of this balancing type.

Conversely, this balancing type does not allow managing elements whose capacities are different: it is always the first element to be discharged that stops discharging, even though there is still energy in the other elements.

Moreover, an architecture of a device with switchable elements is known. For example, such an architecture is known from the following documents: FR2972308, FR2972305, FR2972307, FR2977986, FR2951320, FR2944161.

A device (or "pack") with switchable elements allows dynamically achieving a balancing of the elements of the pack, by connecting only the desired elements in series and by bypassing the other elements. For example, it allows:

during discharge, using the most charged elements in priority, in order to bring them as quickly as possible to the state-of-charge of the most discharged elements;
  during charging, using the most discharged elements in priority, in order to bring them as quickly as possible to the state-of-charge of the most charged elements.

This allows minimising the difference in charge between the elements, throughout the use thereof. At the end of charging, the elements of a device with switchable elements are better balanced and there is no need, or just slightly, for discharging the most charged elements to finish charging, in contrast with a conventional pack.

Nonetheless, when there is no exchange of energy with the outside, no current flows through the battery pack and consequently no balancing is possible. In addition, if some elements of the pack power a portion of the electronics of the system (microcontroller, drivers of the power switches, . . . ) or auxiliary systems (heating/lighting in a vehicle, . . . ), they continue being discharged while the rest of the elements do not discharge; in such a case, the longer the system remains in a "disconnected output" configuration, the more significant the unbalance between the elements will be.

In other words, in case of a zero current at the output, the known documents, mentioned hereinabove, do not propose a balancing solution. Indeed, in the absence of any current that flows through the battery pack, it is not possible to make the state-of-charge of the elements vary.

Hence, the problem of being able to perform or carry on balancing of the different elements of a switchable-type architecture of a battery "pack" arises, when the latter is disconnected from the load or supplies it at a zero voltage.

DISCLOSURE OF THE INVENTION

The objective of the invention is to be able to perform a balancing of the elements of a battery or of a battery pack when the latter is disconnected from the load or supplies it at a zero voltage.

The Invention provides a switchable battery device, or pack, whose elements could be balanced even when the device is disconnected from the load or if a zero voltage is supplied at the output.

The invention also provides a method enabling a switchable battery device, or pack, to balance the elements of the device even when the latter is disconnected from the load or else if it supplies a zero voltage at the output.

To this end, the invention relates to a battery or battery pack type device including a first terminal, a second terminal and a plurality of energy storage elements able to be set in series and/or in parallel between said first terminal and said second terminal, each element may include:

a) switch means for connecting it in series and/or in parallel, with at least one element, or to disconnect it from one or more other element(s),
  b) conductor means for conducting a current, called main current, via a circuit or route (including at least one conductor) parallel to the element, called "by-pass" circuit or route, when the element is disconnected or is not connected in series and/or in parallel (in other words the element is connected neither in series nor in parallel) with one or more other element(s), and/or conductor means for setting said element in parallel with another.

The device according to the invention may include:

c) means for establishing a short-circuit between said first terminal and said second terminal of the battery when the latter is disconnected or supplies a zero voltage;
  d) control means, specifically adapted to select at least one first energy storage element in a first state and at least one second energy storage element in a second state, and to make a current circulate at least from the first element to at least the second element, or at least between these 2 elements, when the first terminal and the second terminal of the device are short-circuited.

In the present application, a "by-passed" element is an element that is disconnected but with means, forming for example a circuit (which may include one or more conductive element(s), for example a transistor) or parallel or alternative route to the disconnected element, enabling the circulation of a current, called main current, in the battery; the current then flows through these means, for example through this circuit or route parallel or alternative to that of the element, for example through one or more parallel conductive element(s) which has/have remained connected or else via one or more conductive element(s); the current flows in this parallel circuit or route, for example by closing at least one means forming a power switch while a series power switch (or the switch means for connecting the element in series with at least one other element) of the element is open; a "by-pass" route of one element may therefore consist of a portion of a circuit or route alternative to this element for the current of the battery or of the pack.

In general, in the context of the present invention, one seeks to balance a state of one or more element(s) of the battery or of the pack, this state being for example defined by a function which depends on, or is representative of, the state-of-charge, and/or the voltage, and/or the state-of-health, and/or the temperature, and/or the impedance, and/or the available power of the element. This function may be the identity function, in which case the state is, or is represented by, for example one or more parameter(s) defined at least by the charge (or the state-of-charge), and/or the voltage, and/or the state-of-health, and/or the temperature, and/or the impedance, and/or the available power. Consequently, a "state" may be a state-of-charge, but other state types are also described. For example, the state of each element may be representative of its charge and/or of its voltage, for example of the charge and/or of the voltage of the element corrected as a function of temperature and/or the state-of-health.

Hence, the means for controlling a device according to the invention may be specifically adapted to stop the current which circulates at least from the first element to at least the second element, or which circulates at least between these 2 elements, when the first terminal and the second terminal of the device are short-circuited, for example when the state of at least this first element has a value equal, or close, to that of at least the second element or to the average value of this state for at least one portion of the elements.

In general, herein and in the remainder of this description, a value is "close" to another value, or these 2 values are "substantially"" equal, means that these 2 values are different by at most 5% or at most 20% (in relative accuracy) or by at most 10% with respect to the full scale (in absolute accuracy).

The invention also relates to a method for balancing a battery or battery pack type device, including a first terminal, a second terminal and a plurality of energy storage elements in series which can be set in series and/or in parallel between said first terminal and said second terminal, each being able to be associated with switch means for connecting it in series and/or in parallel or to disconnect it and possibly bypass it; this method may include:

a) the establishment of a short-circuit between said first terminal and said second terminal of the device when the latter is disconnected or supplies a zero voltage;

b) the selection of at least one first energy storage element having a first state and at least one second energy storage element having a second state;

c) the circulation of a current, at least from the first element to at least the second element, or at least between these 2 elements.

The circulation of this current can be stopped when the state of the first element has a value equal, or close, to the state of the second element or to the average value of this state for at least one portion of the elements.

According to the invention, it is therefore possible to close the electrical circuit (by short-circuiting the output of the battery pack) and make current flow through the battery pack, so as to charge some elements while others are being discharged. Thus, for example, it is possible to transfer energy from the elements, for example the most charged ones and/or the hottest ones, to the least charged and/or the least hot elements, while the voltage at the output of the device remains zero.

By progressively selecting the elements to be disconnected, it is for example possible to charge or discharge some elements in priority, in order to keep all elements balanced in terms of charge.

A current, called main current, can circulate via a circuit or route (including at least one conductor) parallel to the element, called "by-pass" circuit or route, comprising for example one or several conductors, when the element is disconnected or is not connected in series and/or in parallel (in other words the element is connected neither in series nor in parallel) with one or more other element(s), and/or said element can be set in parallel with another element, for example with help of one or several conductors.

In a device or a method according to the invention, each element may include one or more elementary cell(s) and/or electrochemical cell(s) and/or one or more capacitance(s) and/or one or more supercapacitance(s) and/or one or more storage(s).

In a device according to the invention, the control means may be specifically adapted to calculate, or else in a method according to the invention it is possible to calculate, for each element, a so-called priority state or coefficient ($c_{cell\_i}$), which defines a charging or discharging order of the elements, this coefficient may be normalised (i.e. the value of this coefficient is divided by its maximum value, the normalised maximum value being equal to 1); this coefficient is for example a coefficient representative of the voltage of the considered element and/or a coefficient representative of its state-of-charge and/or a coefficient representative of its state-of-health and/or a coefficient representative of its temperature and/or a coefficient representative of its Impedance and/or a coefficient representative of its power, and/or possibly any function or any weighing, for example the average, of this or these coefficient(s) for at least one portion of the elements. By "average", it should be understood, herein and throughout the entire description, either the average in mathematical terms, or a value to which one seeks to make the state of all elements tend.

In a device according to the invention, the control means may be specifically adapted to perform, or a method according to the invention includes:

the selection of at least one first element and of at least one second element such that the coefficient of the first element is higher than the coefficient of the second element;

the circulation of a current at least from said first element to at least said second element, or between at least these two elements, when the first terminal and the second terminal of the device are short-circuited.

In a device according to the invention, the control means may be specifically adapted to regulate, or else in a method according to the invention it is possible to regulate, for example using said control means specifically adapted to this end, the current that circulates at least from the first element to at least the second element, or at least between these two elements, when the input and the output of the device are short-circuited.

For example, this current is regulated as a function of the discrepancy between the coefficient of the first element and of the second element or as a function of the discrepancy between at least the coefficient of the first element and/or of the second element and an average of this same coefficient calculated for several elements.

In a device according to the invention, the control means may be specifically adapted to, or in a method according to the invention, it is possible to compare, for example using said control means specifically adapted to this end, the coefficient ($c_{cell\_i}$) of one or more element(s) and/or the sum of the coefficients ($c_{cell\_i}$) of several elements, with the average ($c_{moyen}$)• of the same coefficient of at least one portion of the elements. In a device according to the invention, the control means may be specifically adapted to, or in a method according to the invention, it is possible, for example using the control means specifically adapted to this end, to:

- select n (n≥1) first energy storage element(s) in a first state-of-charge from among the elements whose coefficient ($c_{cell\_i}$) is higher than the average cm of the same coefficient of all elements;
- select n (n≥1) second energy storage element(s) in a second state-of-charge from among the elements whose coefficient ($c_{cell\_i}$) is lower than the average ($c_{moyen}$)• of the coefficients of all elements;
- make a current circulate from said n first element(s) to said n second element(s) (n≥0), or between at least this or these n first element(s) and said n second element(s), when the first terminal and the second terminal of the device are short-circuited;
- possibly, stop the circulation of the current when the coefficient of the n (n≥1) first energy storage element(s) is equal, or close, to the coefficient of the n (n≥1) second energy storage element(s).

In such a device according to the invention, the control means may be specifically adapted to, or in a method according to the invention, it is possible, for example using said control means specifically adapted to this end, to:

- calculate a first sum of the voltages of at least one portion of the first elements whose coefficient ($c_{cell\_i}$) is higher than the average ($c_{moyen}$)• of the coefficients of all elements;
- calculate a second sum of the voltages of at least one portion of the second elements whose coefficient ($c_{cell\_i}$) is lower than the average ($c_{moyen}$)• of the coefficients of all elements;
- make a current circulate between said at least one portion of the first elements and said at least one portion of the second elements.

A device according to the invention may further include means for reversing, or not, the polarity of one or more element(s).

A method according to the invention may include a reversal of the polarity of one or more element(s).

In a device or in a method according to the invention, it is possible, for example using the control means specifically adapted to make first a constant current, and then a current at a constant voltage circulate, from at least one first element to at least one second element.

The Invention may apply to all storage systems based on a switchable architecture, i.e. a battery or a set of batteries, composed by elements able to be set in series, disconnected, bypassed by a parallel route or set in series with a possible reversal in the polarity, or else set in parallel with a neighbouring element. An "element" may be an elementary cell or a group of elementary cells connected in series and/or in parallel. In general, the invention also applies to the cases where the elements are associated with DC/DC converters.

The invention can also apply to batteries including several accumulators of different technologies (for example different battery chemistries, capacitances, supercapacitances . . . ) and/or of different generator technologies (fuel cell, solar panels . . . ).

In the present application, a reference to one or more switchable element(s) should be understood as also covering a combination of several electrochemical cells, and/or several capacitances, and/or several fuel cells, and/or several energy sources/generators . . . .

A combination of several elements that can be connected in series and/or in parallel is also called "module".

The invention also allows keeping the elements balanced during charging, by prioritising the discharged elements throughout the entire charging so that all elements are completely charged at the same time. In some cases, one could decide that the elements should be used differently over a substantial portion of charging, for example to allow for very high charging currents. In this case, for example, the elements with the lowest impedance are favoured (which have a low internal resistance) and only when approaching the end of charging does one consider re-balancing the state-of-charge of the elements. This is possible thanks to the high intrinsic balancing capacity of this battery type: it is easy to obtain an average current for one element that is twice as high as that of another element. This balancing capacity may be even higher when authorising setting some elements in a polarity opposite to the other elements, i.e. some elements could be discharged while other are charged, at the same time.

Symmetrically, the invention also allows keeping the elements balanced during discharge, by prioritising the charged elements throughout the entire discharge so that all elements are completely discharged at the same time. In some cases, one could decide that the elements should be used differently over a substantial portion of the discharge, for example to temporarily address a considerable need for current of the connected electrical equipment. In this case, for example, the elements with the lowest impedance are favoured (which have the lowest voltage drop) and off these current peaks, one primarily considers re-balancing the state-of-charge of the elements. This is possible thanks to the high intrinsic balancing capacity of this battery type: it is easy to obtain an average current for one element that is twice as high as that of another element. This balancing capacity may be even higher when authorising setting some elements in a polarity opposite to the other elements, i.e. some elements could be charged while other are charged.

The invention allows carrying out balancing of a battery or of a battery pack, by exchanging energy between the elements when it does not exchange electricity with the outside through its main terminals. In particular, this balancing may take place during pauses in the charging phase, or during pauses in the discharge phase. For example, the invention may be implemented by short-circuiting its main terminals, for example in order to ensure some functions.

"When discharging", the invention allows re-balancing the charge of the elements of the pack, by transferring a portion of the energy from the most charged elements (for example those with the highest impedance, which have been used the least) to the least charged elements (those with the lowest impedance, which have been used the most). "When charging", the invention allows re-balancing the charge of the elements of the pack, by transferring a portion of the energy from the most charged elements (for example those with the lowest impedance, which have been used the most) to the least charged elements (those with the highest impedance, which have been used the least).

In the case where, during the use of the pack, the optimised parameter is not the balance of the elements (like for the previous example), it is possible that, at the end of charging, some elements are completely charged while others are not and that it is not possible to continue charging. By short-circuiting the output, the invention allows re-balancing the elements and resuming charging afterwards with a balanced pack.

BRIEF DESCRIPTION OF THE DRAWINGS

Embodiments of the invention will now be described with reference to the appended drawings wherein.

DETAILED DISCLOSURE OF PARTICULAR EMBODIMENTS

Figure 1:
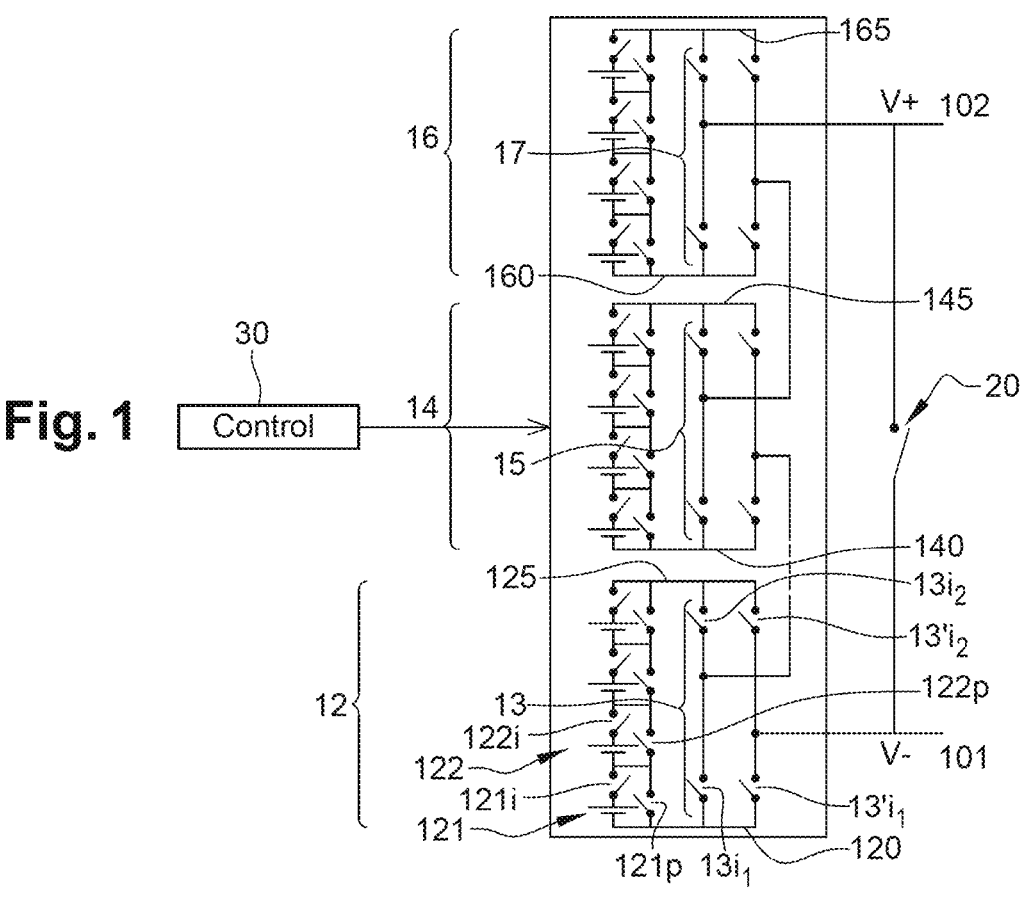
FIG. 1 represents an embodiment of a battery pack according to the invention, implementing an architecture with switchable elements, provided with means for short-circuiting its output.

FIG. 1 represents a battery pack with a switchable architecture, which can be implemented in the context of the present invention.

Such a pack may include M modules (Ei, ($1 \le i \le M$)) 12, 14, 16, each module including a plurality of $N_i$ (the number $N_i$ may be variable from one module to another) elements 121-124, 141-144, 161-164. In FIG. 1, M=3 and N=4, but M may be any number and the number N may also be any number for each module (for example, a module may include one single element). For example, M may be less than or equal to 500 or 1,000; for M=500, in the case of modules Ei each including N=21.5 V elements, the voltage supplied at its terminals by the pack can reach 1,500 V. Still for example, N may be less than or equal to 250 or 500; for N=250, in the case of 2 modules Ei each including 2501.5 V elements, the voltage supplied at its terminals by the pack can reach 1,500 V. Several modules may include several series of elements or cells, these series being disposed in parallel to each other. Each module includes a $1^{st}$ terminal 120, 140, 160 and a $2^{nd}$ terminal 125, 145, 165.

This architecture with switchable elements allows:
regulating a charging current when it is connected to a direct or alternating voltage source, by adjusting the number of elements set in series in real-time;
and/or drawing on an AC network an AC current in phase with the mains voltage thanks to a synchronisation mechanism;

and/or ensuring mains services by drawing a current out-of-phase with respect to the mains voltage (reactive power compensation) or by adding current or current pulse harmonics to improve the shape of the mains voltage/compensate mains disturbances;
and/or individually managing each element of the system, which may be either connected in series with the other elements of the battery pack, or isolated and bypassed by a parallel route or a parallel element (no current no longer flows through the element, but the current circulate in a route in parallel with the latter), either set in series, with an opposite polarity, with the other modules; in particular, one could note that an element has the same polarity as the other elements of the same module; if 2 modules of the pack have opposite polarities, the elements of the first module will have a polarity opposite to the elements of the second module; for example, in the case of FIG. 1, a voltage reversal is performed at the level of the modules 12, 14, 16, each module may contain an element or else several elements that is/are switchable i.e. accompanied with switch transistors, each of the elements themselves may contain several electrochemical cells in series and/or in parallel;
and/or generating, at the output of the battery, a fixed voltage or a variable voltage (for example sinusoidal), with a step equal to the voltage of one element, by connecting, one after another, the elements directly to the output of the system. Indeed, such a system can make the number of elements connected in series, among the available elements, dynamically evolve.

In the context of the present text, an "element" may represent a group of elementary cells set in series and/or in parallel, the voltage step may then be for example in the range of 3.6V, 12V or 24V, 48V or any other value.

As indicated hereinabove, each element can be set in series or in parallel with other elements of the same module or be isolated and the main current diverted on a parallel route and/or replaced by a short-circuit. To this end, power switches, for example transistors, are provided. In this example, like the other examples or embodiments of the present application, the power switches may be made using power transistors, preferably of the NMOS type, or bipolar, or FET, or JFET, or IGBT transistors. The power switches thus implemented allow using, or not, some elements and/or some modules of elements depending on needs and/or achieving an optimisation of the use of the battery pack.

Like in the illustrated example, each element may be provided (only some power switches associated with the element 121 are numbered in FIG. 1):
with one or more element power switch(es) $121_i$ to connect or disconnect this element of the battery; it is possible to have several elements in parallel with each element that has its power switch in series; in this case, an element can be disconnected and the main current continues flowing throughout the remaining elements in parallel; and/or it is possible, like in FR2977986, to toggle or flip elements or cells from a series configuration into a parallel configuration and vice versa, and/or exclude the element or the cell;
with one or more parallel power switch(es) $121_p$ to bypass this element, or not, and therefore establish a conductive route parallel to the element or a short-circuit of this element when the latter is disconnected; in particular with respect to the main current that circulates in the power route between the terminals 101 and 102 of the battery pack. The battery pack and/or each element, or one or more element(s), may be provided with a sensor for measuring charging of the element and/or with a sensor for measuring the voltage at the terminals of the element and/or with a sensor for measuring the temperature of the element and/or with a sensor for measuring the mechanical deformation of the element and/or with a sensor for measuring gas in the element (for example to detect an overcharging, or an overheat or a leak that might cause the generation of gases) and/or with an acoustic sensor (either to detect a chemical reaction in the element, or else, if it consists of an ultrasonic-type sensor, to characterise the element, similarly to the sonography principle or in the form of a characterisation of an acoustic channel) and/or a chemical sensor, for example to measure the density of free ions U or others in the element. In general, it is possible to measure the state-of-charge ("SoC") or the state-of-health ("SoH") based on the voltage and/or current and/or temperature measurements.

In general, the state-of-health is defined by the degradation of the charging amount that a cell (or more generally an element) could store/deliver, in comparison with its original state (prior to any use), at equal current. A 100% SoH applies when there is no degradation, a 0% SoH means that the cells can no longer store energy.

It is also possible to define the capacity ratio in Ah between the capacity of the cell (or more generally an element) at a time point t and its capacity when it was new. The capacity of a cell is the number of Amps-hour (Ah) (the Ah is a unit homogeneous with Coulomb) that the cell can deliver following a complete charging. Amps-hours correspond to an integration of the current, for the capacity, this consists in integrating the current between the start and the end of discharge. One could also find a definition of the SoH in the following link: https://www.labellebatterie.com/soh•batterie•et•capacite•ce-quil•faut•comprendre/

Figure 2:
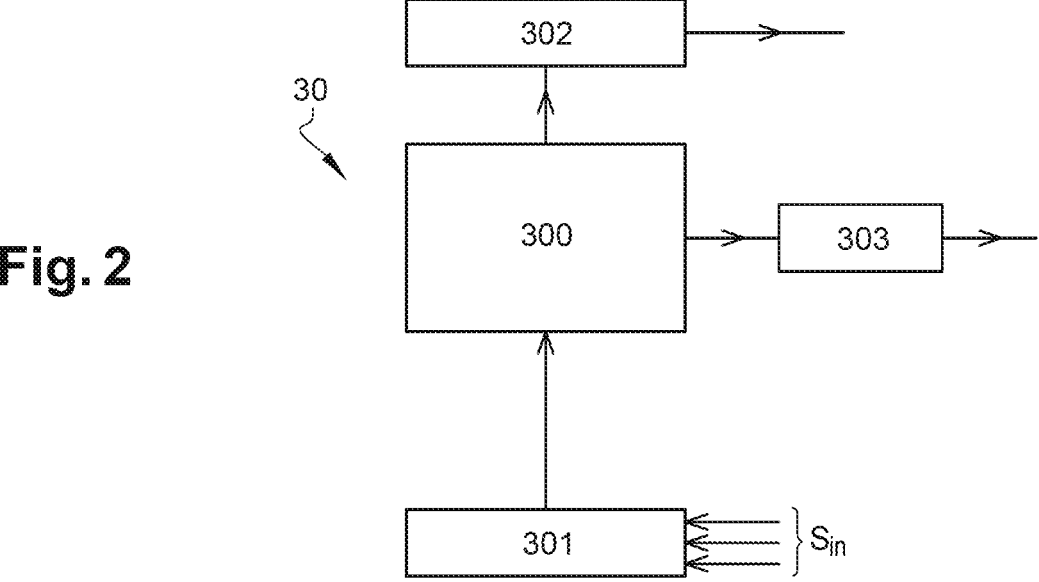
FIG. 2 schematically represents an embodiment of the control means implemented in the context of a battery pack according to the invention.

The device may include a control circuit 30 or a controller which allows, in particular, controlling opening and closure of the power switches of the different elements. The signals that originate from the sensor(s) can be transmitted to this control circuit. More accurately, as illustrated in FIG. 2, the control circuit 30 may include:

a processor or microprocessor or FPGA ("Field Programmable Gate Arrays") or ASIC ("Application-Specific Integrated Circuit") 300 specifically adapted to, or programmed to, implement a method according to the invention;

means, or a circuit, 301 for receiving measurement signals $S_{im}$ of one or more sensor(s) associated with one or more element(s) of the battery pack and to supply these signals to the processor or microprocessor;

means, or a circuit, 302 for controlling the open or closed state of the different power switches associated with the different elements of the battery pack, and for controlling the open or closed state of the different power switches of the different H-bridges (cf. hereinbelow), on instructions from the processor or from the microprocessor;

means, or a circuit, 303 for controlling the open or closed state of the power switch(es) of the means 20, for example on instructions from the processor or from the microprocessor.

Specific electronics (not represented in the figures) may be associated to each module 12, 14, 16. In this case, the control unit 30 can advantageously communicate with each specific piece of electronics of each module, for example via a communication bus, still for example a common and galvanically-isolated bus. For example, the control circuit 30 can:

send to the specific electronics of each module the position that the power switches, whether the cell power switches and/or the power switches of the H-bridge (cf. hereinbelow) of the module, should take on within the module;

and/or possibly received from the modules information that have been measured locally by the electronics of each specific electronics;

and/or possibly access (receive or read) more general measurements, for example the voltage of the battery pack and/or the current that flow through the battery pack. These general measurements are made by measuring means (sensors), for example associated to the control unit without passing through the electronics of the modules. Similarly, the control of the power switch 20 could be done without passing through the electronics of the modules, but through an electronic interface between the control circuit 30 and the power switch 20.

According to a particular embodiment, the means (or circuits) 302 and 303 and/or 301 may be integrated within the same unit.

Each module may also include a H-bridge 13, 15, 17 placed between the $1^{st}$ terminal and the $2^{nd}$ terminal of the module, which allows reversing, or not, the polarity of the connected elements; in one variant, not represented in the figures, it is possible to implement a controlled switch or a controlled changeover switch, for example an electromechanical relay which serves as a changeover switch (next, only the variant implementing H-bridges will be described, but the invention could also be adapted to the case of changeover switches). This bridge includes the power switch means $13_{i1}$, $13_{i2}$, $13'_{i1}$, $13'_{i2}$ . . . (only the power switches of the H-bridge 13 associated with the module 12 are numbered in FIG. 1) allowing setting a module in series with the next module and/or connecting the module to a $1^{st}$ terminal (which could be arbitrarily described as the input terminal) 101 or a $2^{nd}$ terminal (which could be arbitrarily described as the output terminal) 102 of the pack. In each branch of the H-bridge, a point between the power switches of this branch can be connected to a point between the power switches of a branch of a H-bridge of a neighbouring module or of the $1^{st}$ terminal 101 or of the terminal 102 of the entire system.

Each module 12, 14, 16 of the example of FIG. 1 can connect elements to the output 1, 2, 3 or 4 in series, in both polarity ways. More generally, for M modules, each module i ($1 \le i \le M$) including $N_i$ elements ($1 \le N_i$), each module may connect to its output 1, . . . or $N_i$ elements in series, in both polarity ways.

Since each module is independent: its H-bridge can be oriented in any manner with respect to that of the other modules.

Means 20 allow achieving a short-circuit between the terminal 101 and the terminal 102 of the pack; these means 20 include for example a power switch, for example a transistor of the type mentioned hereinabove, disposed between this input and this output. For example these means 20 are controlled by the control means 30. One could note that, alternatively, a manual control is possible, although this is less interesting because the operation is then no longer automatic.

An example of a balancing method according to the invention, implementing a short-circuit mode using the means 20; is as follows:

the means 20 are closed;

the state-of-charge of the different elements is measured or estimated; alternatively, this measurement or this estimate may have been made before closure of the means 20;

then one or more of the most charged element(s) is/are set in a first polarity and one or more of the most discharged element(s) is/are set in the opposite polarity; the control device 30 controls the power switches of the elements, of the modules and/or of the H-bridges to make a current circulate from the element(s) set in the first polarity (the most charged one(s)) to the element(s) set in the second polarity (the least charged one(s)); in other words, a current from the first polarity to the second polarity is regulated and energy is transferred from the most charged element(s) to the most discharged element(s);

this current circulates as long as the element(s) that is/are being charged has/have not reached a predetermined charging level, or the same charging level as the most charged element(s) or the other element(s).

It is possible to measure or estimate, preferably permanently or periodically, the state of the connected elements, in order to identify or determine the end of balancing.

Hence, the invention allows proceeding with a balancing of a state-of-charge. But it could also proceed with other balancing types, for example:

based on the maximum available power and/or based on the remaining available energy and/or based on temperature (it is possible to heat up the elements: it is therefore possible to bring cold, or the coldest, elements to a hotter temperature); and/or by seeking to balance the states-of-health (for example by preserving the most weak/fragile element(s));

and/or by seeking to increase efficiency (by favouring the element(s) with the lowest internal resistance during current peaks) and/or by seeking to increase the expected lifespan . . . .

To proceed with these other balancing types, it is possible to measure or estimate the (maximum or remaining) available power and/or the state-of-health and/or the efficiency and/or the expected lifespan by known estimation methods, for example the measurement of the internal resistance for the maximum available power, or coulometry for the remaining available energy, or a complete discharge/charging for the state-of-health. In other words, one then seeks to regulate the state of different elements of the battery pack according to one or more of the above-mentioned parameters (for example maximum power and/or remaining energy, etc.).

According to an embodiment of the invention, it is possible to calculate, for each element I, a coefficient, or a state, called priority coefficient or state, $c_{cell\_i}$, based on the voltage of the element, and/or on its SoC (state-of-charge), and/or its SoH (state-of-health), and/or its temperature, and/or its impedance or generally based on any weighing of parameters related to the elements and/or to the power demanded or injected in the battery at a given time point. Examples of such coefficients are given at the end of this description. In some cases, for example the voltage, the coefficient, or the state, based on the voltage of the element can be simply the voltage itself; more generally, in its simplest form, this coefficient can be reduced to the parameter itself. In general, the state of the element that should be balanced can be represented or quantified by a function of the measured parameter(s). The priority coefficient or the state can be assimilated to each other or identified with each other. The priority coefficient or the state can be normalised (and comprised between 0 and 1, cf. the examples of FIGS. 6 to 8). Throughout the entire application, it is possible to indifferently use the "state", or the term "state", or the "coefficient", or the term "coefficient".

As already explained hereinabove, an element:

may be or include one cell or several cells in series and/or in parallel, for example in a fixed configuration, with no power switch to be driven, such as that/those identified by the references 121 and 122 in FIG. 1;

and/or a switchable unit which may contain several elementary cells, but it could be managed as one single set.

A coefficient ccell_i may be associated to an element.

Afterwards, it is possible to calculate, for each element, the discrepancy (or the "delta") between its state, or its priority coefficient, and the average state, or the average priority coefficient, of the battery pack. This difference (delta) may be positive (for example if an element is rather charged in comparison with the average) or negative (for example if an element is rather discharged in comparison with the average). The discrepancy between the state, or the priority coefficient, of the element i and the average state, or average priority coefficient, is denoted $\Delta c_{cell\text{-}i}$:

$$\Delta c_{cell\_i} = c_{cell\_i} - c_{moyen} \quad\quad \text{[MATH 1]}$$

For example, the element that has the highest (positive) discrepancy is the element that should be discharged the most and the element with the lowest (negative) discrepancy is the element that should be recharged the most. More generally, one could wish to discharge an element i that has a $1^{st}$ discrepancy $\Delta c_{cell\text{-}i}$ and charge an element i' that has a lower discrepancy $\Delta c_{cell\text{-}i'}$; preferably, one seeks to bring all states, or coefficients, to the average value of this state, or of this coefficient, for all elements, thereby cancelling all discrepancies between the different states or coefficients. For example, one could seek to obtain an average current by the element substantially proportional to $\Delta c_{cell\text{-}i}$ (in positive or negative value); to this end, it is possible for example to connect each element with a duty cycle, which may be determined for example by a servo-control loop, in order to regulate its current. This servo-control also allows limiting the current that circulates in the elements, for example so as not to exceed its limits.

Consequently, the means 30 or 300 can switch the different switches of the system, for example to make a current circulate:

from the element whose priority coefficient $\Delta c_{cell\text{-}i}$ has the highest (positive) discrepancy and which is the element that is to be discharged the most;

to the element whose coefficient has the lowest (negative) discrepancy and which is the element that is to be recharged the most.

The value of $\Delta c_{cell\text{-}i}$ can be controlled or measured for all or part of the different elements, for example on a regular basis or not, the circulation of the current being interrupted when the desired value(s) of the $\Delta c_{cell\text{-}i}$ of one or more element(s) reached. To determine the current to be circulated in each element, it is possible to proceed, at first with a constant current, and then with a constant voltage in order not to exceed a limit voltage for each element. Indeed, each element has a maximum charging (and minimum discharge) voltage that should not be exceeded, which depends on the chemistry of the element. Charging (or discharge) at constant current ends when this voltage is reached. Then, the current is progressively reduced, in order not to exceed the maximum (or minimum) voltage. Indeed, because of the internal impedance of the element, the higher the current, the more the voltage at the terminals of the element rises during charging (and drops during the discharge).

At the end of charging, it is possible to regulate or limit the current so that no element has its voltage that exceeds its maximum authorised voltage at the end of charging. For this purpose, it is possible to measure the discrepancy in voltage of each connected element with respect to its limit voltage (Vmax−Vcell) and it is possible for example to limit the current so that (Vmax−Vcell) approaches 0 yet without becoming negative for the element that is the closest thereto. This substantially amounts to regulate the voltage of the element having the highest voltage based on a voltage setpoint V max; to reach this objective, the regulation loop can act on the current to be circulated.

The current to be circulated and/or the open/close strategy of the different switches of the battery pack, can be determined by the means 30 or 300.

According to one embodiment, it is possible to:

calculate the $\Delta c_{cell-i}$ for all i (i.e. for all of the considered elements);

positively or negatively connect all elements, according to the sign of their $\Delta c_{cell-i}$. It is possible not to connect the elements with $\Delta c_{cell-i}$=equal to zero or close to zero, because these are already balanced;

then determine, for each element, an output current, for example one that is a constant current, then possibly with a constant voltage, if one of the elements to be balanced is close to its voltage at the charging end or at the discharge end, depending on whether this element is in the charging or discharge mode;

then regulate the output current by applying an offset coefficient $c_{offset}$ to the delta $\Delta c_{cell-i}$ of one or more or all of the elements:

$$\Delta c_{cell\_i} = c_{cell\_i} - c_{moyen} + c_{offset}, \quad \text{[MATH 2]}$$

In other words, starting from a measurement of error between the measured output current and the desired current, the means 30 or 300 calculate such an offset coefficient and apply it to the considered $\Delta c_{cell-i}$. This can be achieved through a regulation loop, for example executed at 20 kHz, i.e. every 50 ms; or else at any other frequency, for example between 10 kHz and 1 MHz. Moreover, a regulation loop, for example dedicated to each element, may be implemented to regulate, for example individually, the current of each element at a proportion of the main current, in order to enable the element to reach the desired current. This regulation loop has the effect of making all or part of the main current flow through the element, for example by adjusting a connection duty cycle of the element.

By adding an offset on the delta(s) ($\Delta c_{cell-i}$), the servo-control loop of the main current, also called output current, which flows through the battery pack, acts positively or negatively on the positive and negative Delta proportion and therefore on the average number of connected elements and therefore on the open-circuit voltage that prevails at the terminals of the equivalent impedance Z of the short-circuited pack. By mastering the voltage at the terminals of the impedance Z in this manner, the loop is able to act on the output current and to regulate it.

Thus, the current of each element is regulated so as to take in or give, depending on its polarity, a proportion of the output current, for example proportional to its $\Delta c_{cell-i}$. The value of $\Delta c_{cell-i}$ can be controlled or measured for all or part of the different elements, for example on a regular basis or not, the circulation of the current being interrupted (by opening the switch 20) when the desired value(s), for example a predetermined value, of the $\Delta c_{cell-i}$ is reached.

Balancing stops for example when the delta (without taking the offset into account) of all elements reaches (or gets close enough to) zero.

Figure 3:
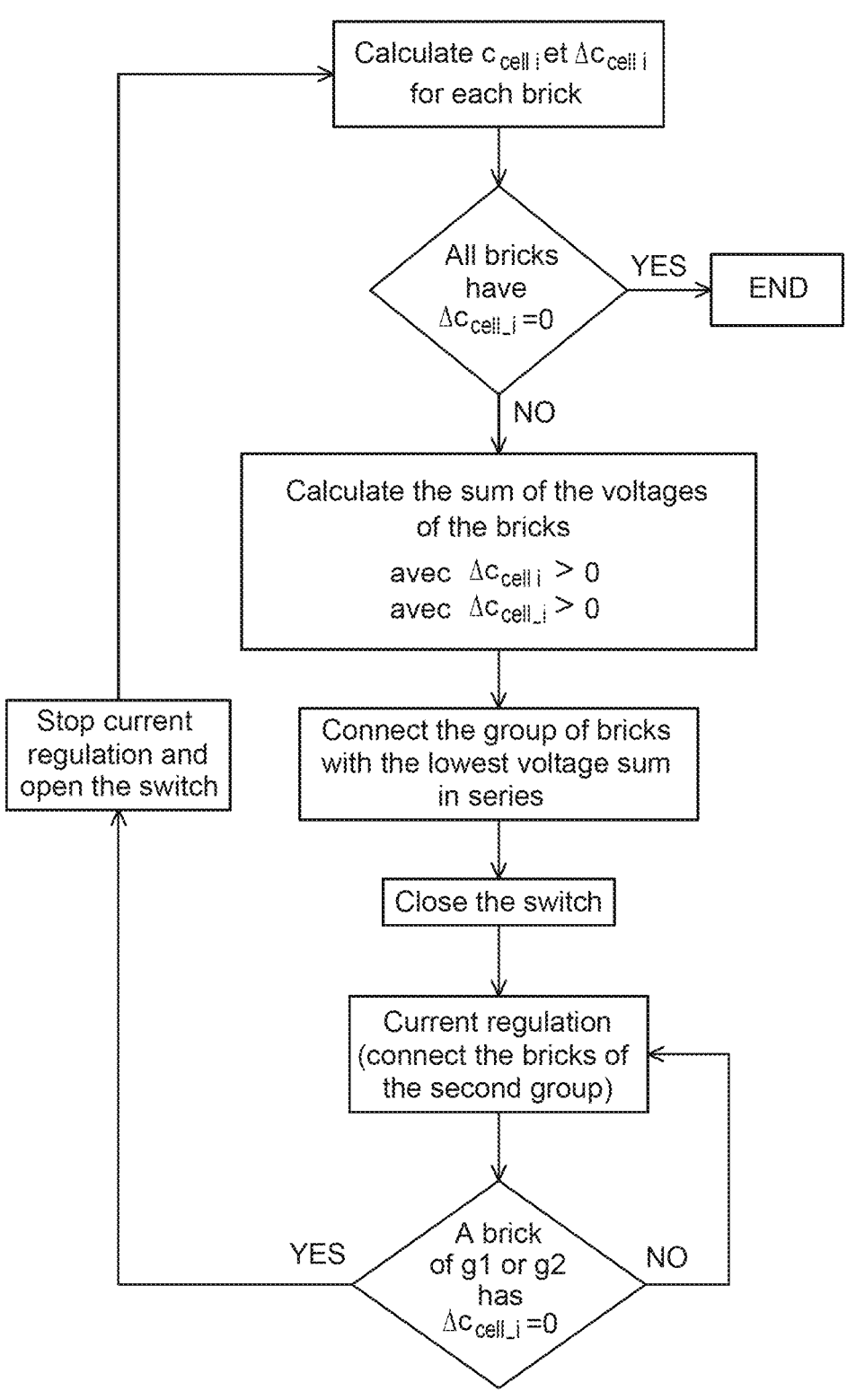
FIG. 3 represents steps of a method according to the invention.

According to another method, illustrated in FIG. 3, it is possible, for example by the means 30:

to calculate the $\Delta c_{cell-i}$ for all elements (step S1);

then (step S3) to calculate the sum of the voltages of all elements with a positive $\Delta c_{cell-i}$ and group these elements which have a positive $\Delta c_{cell-i}$ and calculate the voltages of all elements with a negative $\Delta c_{cell-i}$ and group these elements which have a negative $\Delta c_{cell-i}$, possibly (step S2) it is possible to exclude from these sums the elements with a $\Delta c_{cell-i}$ equal to zero or close to zero, because they are considered to be already balanced;

to select a group $g_1$ of elements the sum of the voltages ($V_{g1}$) of which, when they are connected in series, is low (step S4) and a group $g_2$ of elements the sum of the voltages ($V_{g2}$) of which, when they are connected in series, is high; more generally, it is possible to have: $V_{g1} < V_2$•; alternatively, it is possible to do without the previous step, i.e. it is possible to select a group of elements $g_1$ (resp. $g_2$) without having calculated beforehand the sum of the voltages of all elements with a positive (resp. Negative) $\Delta_{cell-i}$;

to connect in series, in a given polarity, the elements of the group with a lower voltage sum, $g_1$, in the same way;

to close the power switch 20 (step S5) and control opening and/or closure of the switches to make a current circulate between the 2 groups $g_1$ and $g_2$, this current may be positive or negative (step S6);

to perform a current servo-control, preferably according to the discrepancies of delta between the elements, which regulates the number of elements of the group $g_2$ with the highest voltage sum, and which should be connected in the opposite polarity to the elements of the first group $g_1$: by dynamically modifying the number of elements of the first group $g_1$ and/or the number of elements of the second group $g_2$ connected in series, the servo-control manages the output current and consequently regulates the current that flows through the different elements.

This servo-control allows regulating the current that flows through the connected elements, by dynamically modifying the number of the elements of the group $g_2$ that are connected. Thus, it is possible to reduce the delta discrepancies between the states of the elements, by transferring energy from the elements with a positive state discrepancy to the elements with a negative state discrepancy.

The elements of the 2 groups being connected in reverse polarities:

if g1 contains the elements with a negative discrepancy (and therefore to be charged), since Vg1<Vg2, the servo-control will connect enough elements (or all elements) of g2, in order to discharge the elements of g2 into the elements of g1.

If g1 contains the elements with a positive discrepancy (and therefore to be discharged), the servo-control win connect some (but not all) elements of g2, in order to have Vg1>Vg2 and discharge the elements of g1 into the elements of g2.

For example, the state, or the coefficient, of the elements is calculated throughout the process (step S1), and the state, or the average coefficient as well as the discrepancy $\Delta_{cell-i}$ could also be recalculated. Once an element has reached a $\Delta_{cell-i}$ equal to zero, or very close to zero, it is disconnected (step S2) and a new configuration, for the first group $g_1$ and for the second group $g_2$, is calculated, the elements that are already balanced not being included in the new groups $g_1$ and $g_2$ and the current servo-control no longer using them to regulate the current;

end balancing (by opening the power switch 20) when all elements have reached a $\Delta_{cell-i}$ equal to zero, or very close to zero, because it is considered that all elements are balanced.

In a method as described hereinabove, it might be interesting to make the number of elements in the group $g_1$ vary, for example, when one single element of the group $g_1$ limits the maximum current for the entire group: by temporarily excluding this element, the current that the group $g_1$ could accept increases.

The current to be circulated and/or the open/close strategy of the different switches of the battery pack, can be determined by the means 30 or 300. These means stop balancing by opening the power switch 20.

According to still another method, it is possible, for example using the means 30 or 300, to perform balancing without regulation (it is herein considered that voltage equalisation amounts to balancing); the means 30 or 300:

calculate the $\Delta_{cell-i}$, for example by taking only the voltage of the elements into account (the coefficient or the state of each of the elements then being equal to the voltage of this element);

control opening and/or closure of the switches to make a current circulate from the element that has the highest $\Delta_{cell-i}$ to the element that has the lowest $\Delta_{cell-i}$, the last element being set in reverse polarity with respect to the previous one;

then recalculate the $\Delta_{cell-i}$, preferably at least of the connected elements or of all elements; for example when an element amongst the connected element has a $\Delta_{cell-i}$ equal, or close, to another non-connected element, then the elements with the highest $\Delta_{cell-i}$ are set in series, the same applying to the elements with the lowest $\Delta_{cell-i}$ (but with an opposite polarity); one could note that, for example at the beginning, it is possible to have only 2 connected elements, and therefore when an element amongst the 2 connected elements has a $\Delta_{cell-i}$ equal, or close, to another non-connected element, then the 2 elements with the highest $\Delta_{cell-i}$ are set in series, the same applying to the 2 elements with the lowest $\Delta_{cell-i}$ (but with an opposite polarity);

then control opening and/or closure of the switches to make a current circulate from these 2 elements with the highest $\Delta_{cell-i}$ to the 2 elements that have the lowest $\Delta_{cell-i}$, these being placed in reverse polarity with respect to the previous ones;

then recalculate the $\Delta_{cell-i}$ preferably at least of the connected elements or of all elements; when a connected element has a $\Delta_{cell-i}$ equal, or close, to another non-connected element, then the 3 elements with the highest $\Delta_{cell-i}$ are set in series, the same applying to the 3 elements with the lowest $\Delta_{cell-i}$ (but with an opposite polarity); This process can be carried on with 4, then 5 . . . elements. When n (n even, n>2) elements are reached: the means 30 recalculate the $\Delta_{cell-i}$ preferably at least of the connected elements or of all elements; when one of the n or 2n connected elements has a $\Delta_{cell-i}$ equal, or close, to a non-connected element, then the n+1 elements of the highest $\Delta_{cell-i}$ are set in series, as well as the n+1 elements of the lowest $\Delta_{cell-i}$ (but with an opposite polarity).

At each step:

if a 1st element reaches a zero $\Delta c_{cell-i}$, or close to zero, it could be discarded and, by symmetry, a 1st one of the elements connected in opposite polarity could also be removed, for example that one whose $\Delta_{cell-i}$ is the closest to zero;

if a $2^{nd}$ element reaches a zero $\Delta_{cell-i}$, or close to zero, it could be discarded and, by symmetry, a $2^{nd}$ one of the elements connected in opposite polarity could also be removed, for example that one whose $\Delta_{cell-i}$ is the closest to zero;

and so on until there is no connected element or until the exchanged current is low enough to consider that balancing is completed.

It Is possible to start the process again to better balance the elements. For example, in the case of an odd number of elements, one element will not be connected, while if the process is repeated and if the delta of the element is high enough, this element will be connected and balanced.

When an element with a zero delta is discarded, the symmetrical element is also discarded, inter alia. The last element does not necessarily have a zero delta and restarting the process allows better balancing it.

An element that has been disconnected during the process at a given time because its $\Delta c_{cell-i}$ has reached a value close to zero can be connected again so as to be involved in the process, for example following an update of the $\Delta c_{cell-i}$, still for example if its voltage level has changed after a relief duration.

The interest of this other method is that by associating at the beginning the elements with the farthest deltas, the current transmitted between the two elements is maximised and the reset of these elements in the delta range of the other elements is thus accelerated. However, this method somehow complicates the operation and, while it maximises the exchanged current, it does not necessarily maximise the exchanged power, the number of connected elements being low at the beginning and therefore the associated voltage being low ($P=U\times I$).

According to still another method, it is possible, for example using the means 30, to perform balancing without regulation (it is herein considered that voltage equalisation amounts to balancing); the means 30:

calculate the $\Delta c_{cell-i}$, by taking into account the voltage of the elements;

identify and group the elements having a positive $\Delta c_{cell-i}$ and identifying and grouping the elements having a negative $\Delta c_{cell-i}$;

connect all elements of the smaller group (if there are more elements with a positive (respectively negative) delta, then all elements with a negative (respectively positive) delta are connected);

connect the same number of elements of the second group, for example those having the $\Delta c_{cell-i}$ the farthest from the zero $\Delta c_{cell-i}$, with a polarity opposite to the elements that are already connected; for example, if the pack contains 6 elements with a positive delta and 10 with a negative delta, all elements with a positive delta and, by symmetry, 6 elements with a negative delta (the 6 elements with the delta the farthest from the zero delta) will be connected.

start-up at step 6: considering the previous example, when an element reaches a delta equal or close to zero, it can be discarded and, by symmetry, an element connected in opposite polarity can also be discarded, and that being so until all elements are disconnected. Hence, the process is repeated (the deltas should be recalculated) to balance the elements that are non-connected in the previous cycle. In other words:

if a $1^{st}$ element reaches a $\Delta c_{cell-i}$ equal to zero, or close to zero, it can be discarded and, by symmetry, a $1^{st}$ one of the elements connected in opposite polarity can also be removed, for example that one whose $\Delta c_{cell-i}$ is the closest to zero;

if a $2^{nd}$ element reaches a $\Delta c_{cell-i}$ equal to zero, or close to zero, it can be discarded and, by symmetry, a $2^{nd}$ one of the elements connected in opposite polarity can also be removed for example that one whose $2^{nd}$ is the closest to zero;

and so on until there is no connected element or until the exchanged current is low enough to consider that balancing is completed;

it is possible to repeat the process again, until a $\Delta c_{cell-i}$ elements have a equal to zero, or close to zero.

All of the above-described methods can be implemented with the device described before in connection with FIG. 1.

Figures 4, 5:
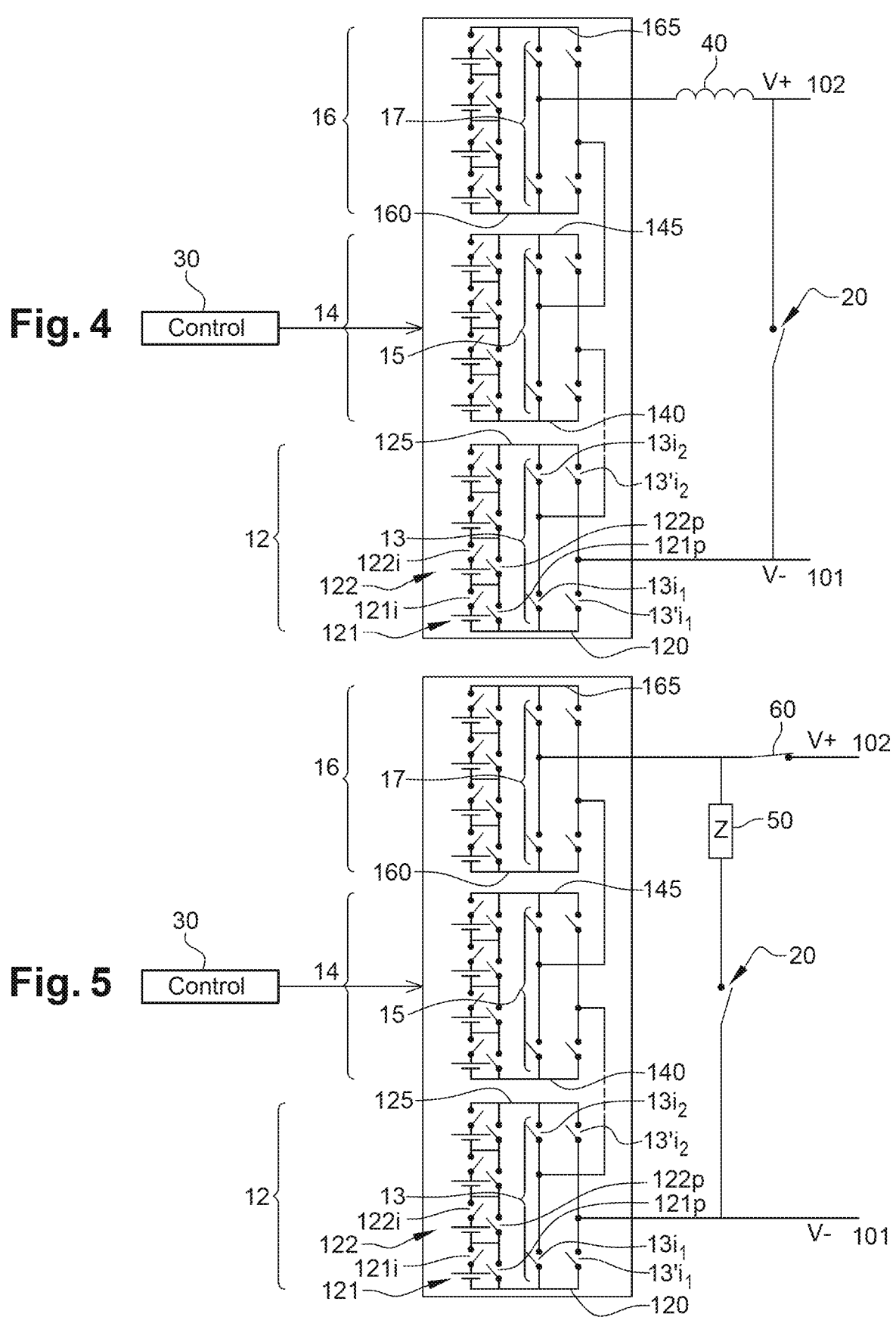
FIG. 4 represents a variant of the device of FIG. 2, with an output inductance.
FIG. 5 represents still another variant of a device according to the invention, with several power switches allowing short-circuiting its output.

Alternatively, illustrated in FIG. 4, a smoothing inductance 40, for example placed at the output of the battery pack, allows smoothing the current at the output of the latter. Still in one variant (not represented in the figures), an inductance may be distributed in the battery pack, for example at the output of each module or of each element. In this case, the power switch 20 is placed after the inductance 40, like in FIG. 4, in order to also benefit from this inductance during the regulation of the internal current of the battery pack when it is placed in the output short-circuit position.

Alternatively, illustrated in FIG. 5, if there is no inductance at the output of the battery pack, it is possible to add one (references 50 in FIG. 5) in series with the power switch 20, in order to smooth the current during balancing and also to better control it. This inductance will not be used during the normal operation of the pack. Alternatively, instead of the inductance, there could be one or more electronic component(s), whether active or passive, allowing smoothing and/or limiting the current.

With such a component in series at the output of the system, the voltage between the positive pole and the negative pole will not be completely zero during balancing. A second power switch 60 may then be useful to avoid powering the equipment plugged to the battery pack with this residual voltage:

in normal operation, the power switch 20 is open and the power switch 60 is closed;

during the phase of balancing by short-circuiting the output, the power switch 60 is open, and the power switch 20 is closed, either permanently or with a variable duty-cycle.

All of the methods described hereinabove and/or with the examples of priority coefficients hereinbelow can be implemented with the device that has just been described, whether in connection with FIG. 1, 4 or 5.

Examples of priority coefficients are given hereinbelow, in connection with FIGS. 6-8. These are examples of coefficients other than the state-of-charge or the state-of-voltage.

Indeed, by balancing, it should be generally understood a balancing of the voltages or of the states-of-charge of the elements; as already explained, in the present application, one looks, more generally, to balance states according to priority coefficients that are not necessarily a mere image of the state-of-charge of the element.

A first example is the following coefficient:

$$c_{cell\_i} = f(SoC) + g(T^\circ) + h\left(Iout^2\,m\Omega\right) \qquad \text{[MATH 3]}$$

Figure 6:
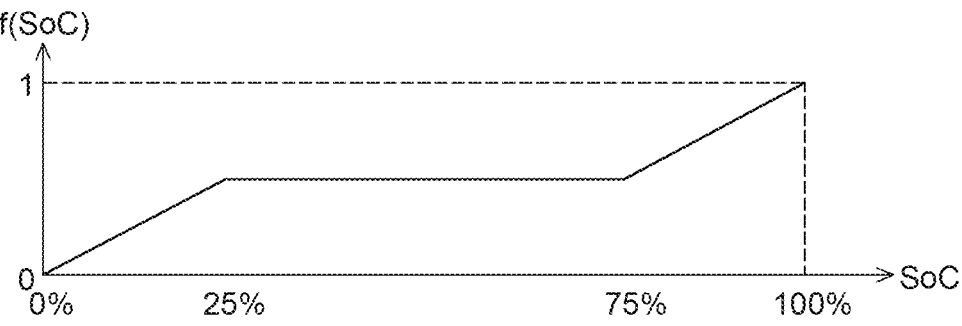
FIG. 6-FIG. 8 allow explaining examples of priority coefficients.
Figure 7:
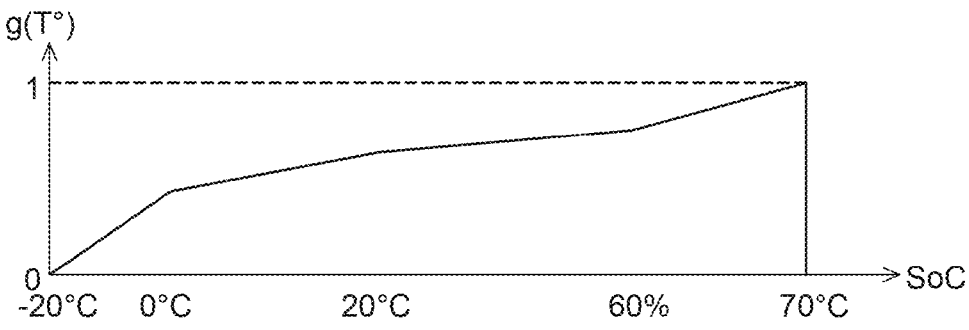
Figure 8:
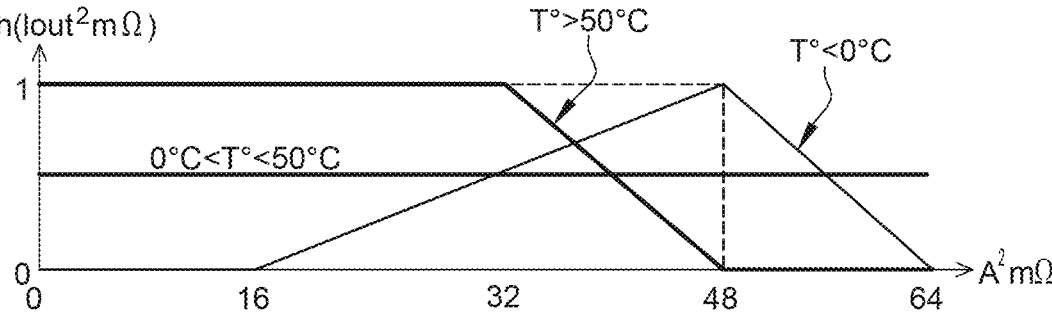

This coefficient involves:

the function f(SoC), whose evolution according to SoC is represented in FIG. 6;

the function g(T°), whose evolution according to T is represented in FIG. 7;

the function h(Iout² mΩ), whose evolution as a function of I² is represented in FIG. 8.

According to this example, it is possible to take into account the SoC at the charging start (for example for 0≤SoC≤25%) and at the charging end (for example for 75≤SoC≤100%) and/or to disregard it the rest of the time (the function f is constant over at least one portion of the domain for example between 25% and 75%) to favour other aspects. Methods for estimating the state-of-charge ("SoC") of the elements are known, for example by the following document which describes different manners to estimate this state-of-charge: M. A. Hannan, M. S. H. Lipu, A. Hussain, A. Mohamed, "A review of lithium-ion battery state of charge estimation and management system in electric vehicle applications: Challenges and recommendations", Renewable and Sustainable Energy Reviews, Volume 78, 2017, Pages 834-854, ISSN 1364-0321, https://doi.org/10.1016/j.rser.2017.05.001. This estimate of the state-of-charge can be used, inter alia, in the context of the present application, in particular to define a use priority coefficient of the elements.

The function g(T°) can take temperature into account at low temperature (which should be taken into account for ageing and/or current availability) and at high temperature (because of the risk of degradation), preferably with a strict prohibition beyond a determined temperature, for example beyond 70° C.

For the function h(Iout² mΩ), several characteristics are represented in FIG. 8, according to the temperature of the considered element (0° C.<T<50° C., T>50° C., T<0° C.).

The parameter Iout² mΩ, directly represents the heat-up power of the connected element at a time point t, the impedance in mΩ typically represents the real part of the impedance of the considered element.

In the given example, it is possible to have, for:

T°<0° C.: a prioritisation for heating, i.e. to be used when the current is higher, possibly with a limitation for very high current, a low-temperature element being less capable of supplying a high current;

0° C.<T°<50° C.: a constant priority, without particular search for heat-up or for temperature limitation;

T>50° C.: a preferred use at low current to limit heat-up.

The elements hereinabove are given as example. It is possible to use any other characteristic while remaining within the scope of the present invention.

A $2^{nd}$ example may be used to maximise the power availability during discharge. For example, one seek to have a useful power $P_{utile}$ as long as possible. Typically, the maximum power is limited by the minimum voltage of the element, its temperature and its resistance in the on-state.

For this purpose, for each element, a minimum SOC (SOCmin) that will enable it to supply the power $P_{utile}$ will be estimated.

Afterwards, a priority coefficient which corresponds to a discrepancy between the current SoC and this $SoC_{min}$ is defined for each brick:

$$c_{cell_i} = SoC_i - SoC\text{min}_i \qquad \text{[MATH 4]}$$

The balancing mechanism will then seek to balance the $c_{cell_i}$ and therefore the discrepancy in the state-of-charge between the current state and the limit state which no longer allows supplying the power $P_{utile}$.

Moreover, it is possible to add a weighing coefficient k with the temperature T to limit the temperature dispersion:

$$c_{cell_i} = SoC_i - SoC\text{min}_i + kT \qquad \text{[MATH 5]}$$

In a $3^{rd}$ example, in addition to their state-of-charge (SoC), the state-of-health (SoH) of the elements is taken into account:

$$c_{cell\_i} = f(\text{mode\_CH\_DCH}) * g(SoC) * h(SoH) \qquad \text{[MATH 6]}$$

While it is possible to assume that all of the elements of a new battery pack have a state-of-health that is equal (to 100%), this is not necessarily true with a pack that have been used. Indeed, the elements of a pack do not age in the same manner and discrepancies in the SoH between the elements could occur as the pack is used.

This solution allows normalising the state-of-charge of one element with respect to its state-of-health and soliciting the elements with the best state-of-health in priority.

The operating mode, whether charging or discharging, may also be taken into account; for example, it is possible to have:

```
f(mode_CH_DCH)=1.
    , with:
mode_CH_DH = discharge (discharging pack)
f(mode_CH_DCH)= −1 with:
    mode_CH_DCH = charge(charging pack)
```

In practice, with equal SoC, when discharging, a portion of the energy of the elements with a better state-of-health will be transferred to the elements with a state-of-health that is less good. In this manner, all of the bricks will have a tendency to reach the discharge end at the same time. Symmetrically, when charging, a portion of the energy of the bricks with a state-of-health that is less good will be transferred to the bricks with a better state-of-health. In this manner, all bricks will have a tendency to reach the charging end at the same time.

In a 4th example, the available Ah during discharge are taken into account for each brick:

$$c_{cell\_i} = f(\text{Ah\_dispo\_DCH}) \qquad \text{[MATH 7]}$$

This mechanism allows redistributing the energy of the pack among the elements, even when they do not have the same start capacitance. For example, it is possible to have a pack composed by elements with different chemistries, which imply that they have different capacitances (depending on their chemistry), even though they have the same SoH. In practice, the energy of the elements with more Ah available is transferred to the less capacitive elements. In this manner, all elements will reach the discharge end at the same time.

Symmetrically, when charging, the mechanism allows transferring energy from the less capacitive elements to the more capacitive elements, in order to make them all reach the charging end at the same time. Hence, we will have:

$$c_{cell\_i} = f(\text{Ah\_dispo\_CH}) \qquad \text{[MATH 8]}$$

Moreover, it is possible to perform a weighing with the temperature T, in order to limit the temperature dispersion:

$$c_{cell\_i} = f(\text{Ah\_dispo\_DCH}) * kT \qquad \text{[MATH 9]}$$

$$c_{cell\_i} = f(\text{Ah\_dispo\_CH}) * kT$$

A particular case of this example consists in setting, during discharge, a constant priority coefficient with a maximum value for the most capacitive elements, in order to discharge them as much as possible into the less capacitive elements. This is useful if the pack contains "reservoir" elements, elements that have a high capacity but are less powerful (incapable of supplying high currents and therefore impossible to use in normal operation). The mechanism will have a tendency to completely discharge the reservoir elements into the other elements, in order to increase the duration of operation of the pack during discharge. Symmetrically, the priority coefficient of the "reservoir" elements will be set at the minimum value during charging.

In the examples hereinabove, when charging or discharging, it is considered that action is done during a charging or discharge pause, i.e. with a short-circuited battery (between the terminals 101 and 102, like in FIGS. 1, 4, 5), i.e. a battery that does not exchange with the outside through its main terminals 101, 102. Typically, for a vehicle, it is possible to have pauses between two uses; similarly, it is possible to introduce pauses during charging (either intentional, or for reasons related to rolling blackout, tariff peaks, the absence of Sun on solar panels . . . ).

The invention claimed is:

1. A battery pack device comprising:
a first terminal;
a second terminal;
a plurality of energy storage elements configured to be set in series or in parallel between said first terminal and said second terminal,
wherein each of the energy storage elements includes:
    at least one switch for connecting the energy storage element in series and/or in parallel with at least one other energy storage element, or to disconnect the energy storage element from one or more other energy storage elements; and
    at least one conductor for conducting a main current parallel to the energy storage element, when the energy storage element is disconnected or is not connected in series and/or in parallel with one or more other energy storage elements;

at least one switch configured to establish a short-circuit between said first terminal and said second terminal of the battery pack device when the battery pack device is disconnected or provides zero voltage;

a control circuit configured to:

select at least one first energy storage element in a first state and at least one second energy storage element in a second state, the first state and the second state each being a function based on at least one of charge, voltage, state-of-health, temperature, impedance, and available power of a respective one of the first energy storage element and the second energy storage element;

circulate a current from the first energy storage element to the second energy storage element when said first terminal and said second terminal of the battery pack device are short-circuited; and stop circulating the current when a value of the first state of the first energy storage element is substantially equal to a value of the second state of the second energy storage element.

2. The battery pack device according to claim 1, wherein each of the energy storage elements includes at least one of one or more electrochemical cells, one or more capacitance elements, one or more supercapacitance elements, and/or one or more storage cells.

3. The battery pack device according to claim 1, wherein the control circuit is further configured to:

calculate, for each of the energy storage elements, a priority coefficient ($C_{cell\_i}$), which defines a charging or discharging order of the energy storage elements, the priority coefficient ($C_{cell\_i}$) being normalizable; or correct the priority coefficient ($C_{cell\_i}$) of at least one of the energy storage elements in order to vary a priority of the at least one of the energy storage elements.

4. The battery pack device according to claim 3, wherein the control circuit is further configured to:

select the at least one first energy storage element and the at least one second energy storage element such that the priority coefficient of the first energy storage element is higher than the priority coefficient of the second energy storage element; and circulate a current from said first energy storage element to at least said second energy storage element when the first terminal and the second terminal of the battery pack device are short-circuited.

5. The battery pack device according to claim 4, wherein the control circuit is further configured to perform at least one of:

regulating the current that circulates from the first energy storage element to at least the second energy storage element when the input and the first terminal and the second terminal are short-circuited; and causing a constant current to circulate from the first energy storage element to the second energy storage element and then causing a constant-voltage current to circulate from the first energy storage element to the second energy storage element.

6. The battery pack device according to claim 5, wherein the control circuit is further configured to:

regulate the current that circulates from the first energy storage element to at least the second energy storage element when the first terminal and the second terminal are short-circuited according to a discrepancy between the priority coefficient or the first state of the first element and the priority coefficient or the second state of the second element or according to a discrepancy between at least the priority coefficient or the first state of the first element or the priority coefficient or the first state of the second element and an average of a priority coefficient or state calculated for several of the energy storage elements.

7. The battery pack device according to claim 3, wherein the control circuit is further configured to:

compare the priority coefficient ($C_{cell\_i}$) of one or more of the energy storage elements and/or a sum of the priority coefficients ($C_{cell\_i}$) of several energy storage elements, with an average ($C_{moyen}$) of the priority coefficients ($C_{cell\_i}$) of at least one portion of the energy storage elements.

8. The battery pack device according to claim 7, wherein the control circuit is further configured to:

select n (n≥1) first energy storage elements in a first state-of-charge from among the energy storage elements whose priority coefficient ($C_{cell\_i}$) is greater than the average ($C_{moyen}$) of the priority coefficient ($C_{cell\_i}$) calculated for all of the energy storage elements;

select n (n≥1) second energy storage elements in a second state-of-charge from among the energy storage elements whose priority coefficient ($C_{cell\_i}$) is less than the average ($C_{moyen}$) of the priority coefficients ($C_{cell\_i}$) calculated for all of the energy storage elements;

circulate a current from said n first energy storage elements to said n second energy storage elements when the first terminal and the second terminal of the battery pack device are short-circuited; and stop circulating the current when the priority coefficient of the n (n≥1) first energy storage elements is approximately equal to the priority coefficient of the n (n≥1) second energy storage elements.

9. The battery pack device according to claim 8, wherein the control circuit is further configured to:

calculate a first sum of voltages of at least one portion of the first energy storage elements whose priority coefficient ($C_{cell\_i}$) is greater than the average ($C_{moyen}$) of the priority coefficients of all of the energy storage elements;

calculate a second sum of voltages of at least one portion of the second energy storage elements whose priority coefficient ($C_{cell\_i}$) is less than the average ($C_{moyen}$) of the priority coefficients of all of the energy storage elements; and circulate current between said at least one portion of the first energy storage elements and said at least one portion of the second energy storage elements.

10. The battery pack device according to claim 1, wherein the state of each of the energy storage elements is computed from charge and/or voltage of each respective one of the energy storage elements, including formulations in which the charge and/or the voltage is corrected based on temperature and/or state-of-health.

11. The battery pack device according to claim 1, further comprising at least one switch configured to reverse a polarity of one or more of the energy storage elements.

* * * * *